Figure 1:
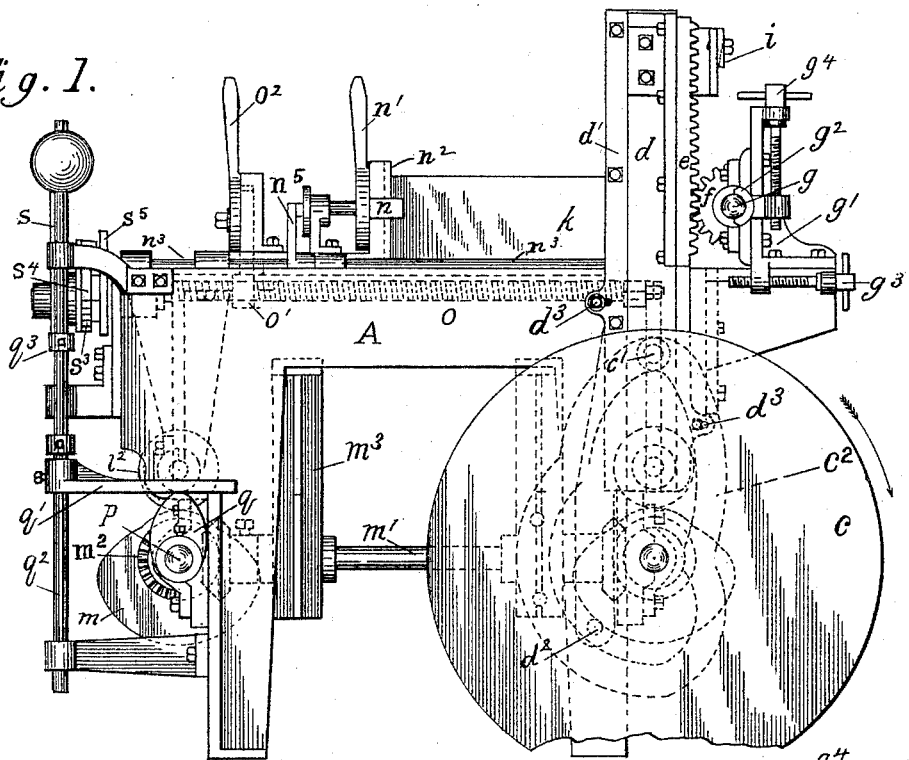

(No Model.)  4 Sheets—Sheet 1.

L. W. TINKHAM.
METHOD OF AND MACHINE FOR CUTTING WOOD DISHES.

No. 497,932. Patented May 23, 1893.

WITNESSES:
David C. Walter
Libbie Brown

INVENTOR.
Lewis W. Tinkham,
By Hiram Hall
His Atty.

(No Model.) 4 Sheets—Sheet 2.
L. W. TINKHAM.
METHOD OF AND MACHINE FOR CUTTING WOOD DISHES.
No. 497,932. Patented May 23, 1893.
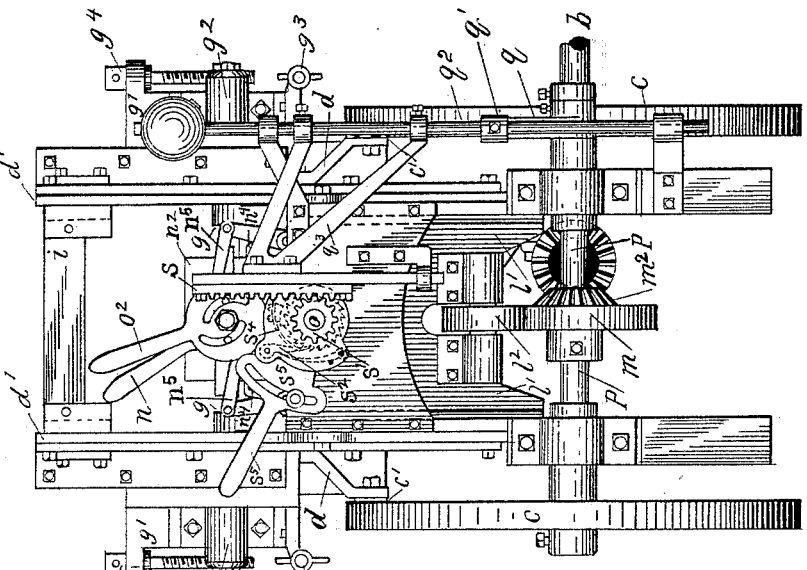
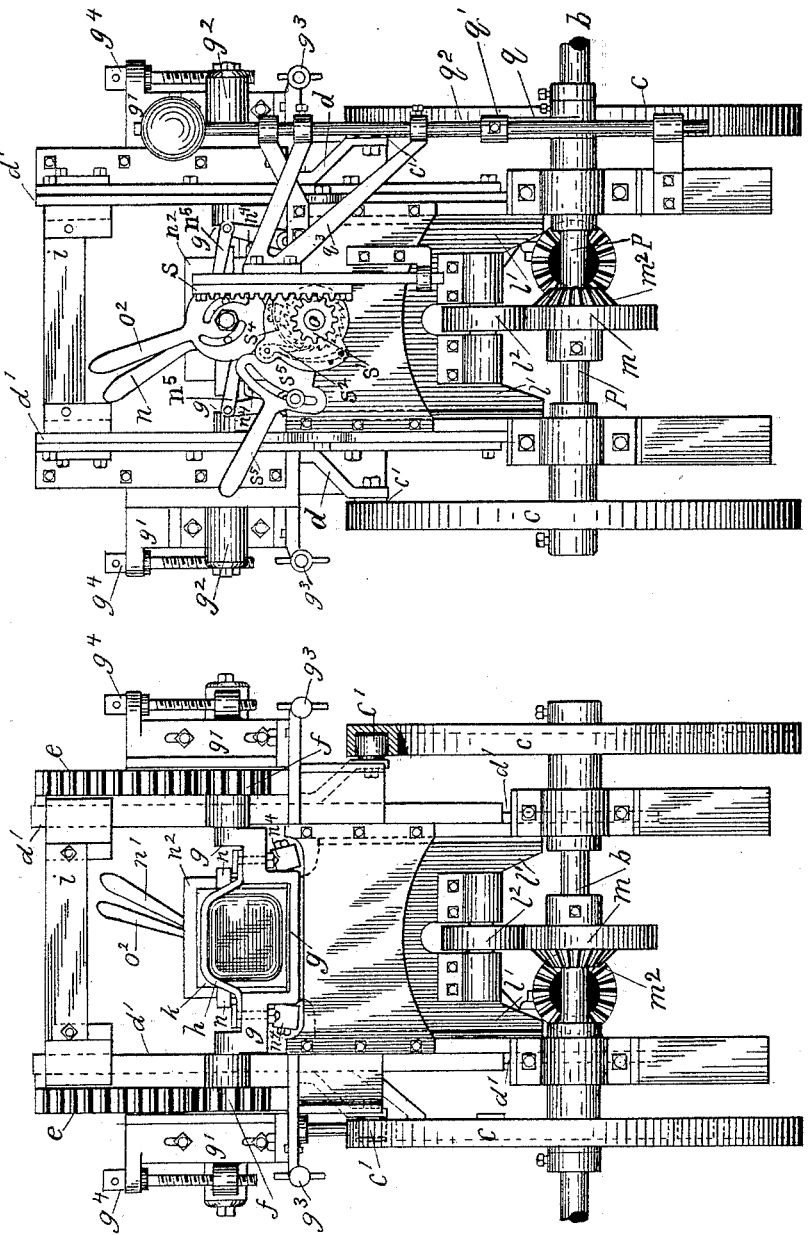
WITNESSES.
David C. Walter
Libbie Brown
INVENTOR.
Lewis W. Tinkham,
By Hinman Hall
His Atty (No Model.)  4 Sheets—Sheet 3.
L. W. TINKHAM.
METHOD OF AND MACHINE FOR CUTTING WOOD DISHES.
No. 497,932.  Patented May 23, 1893.
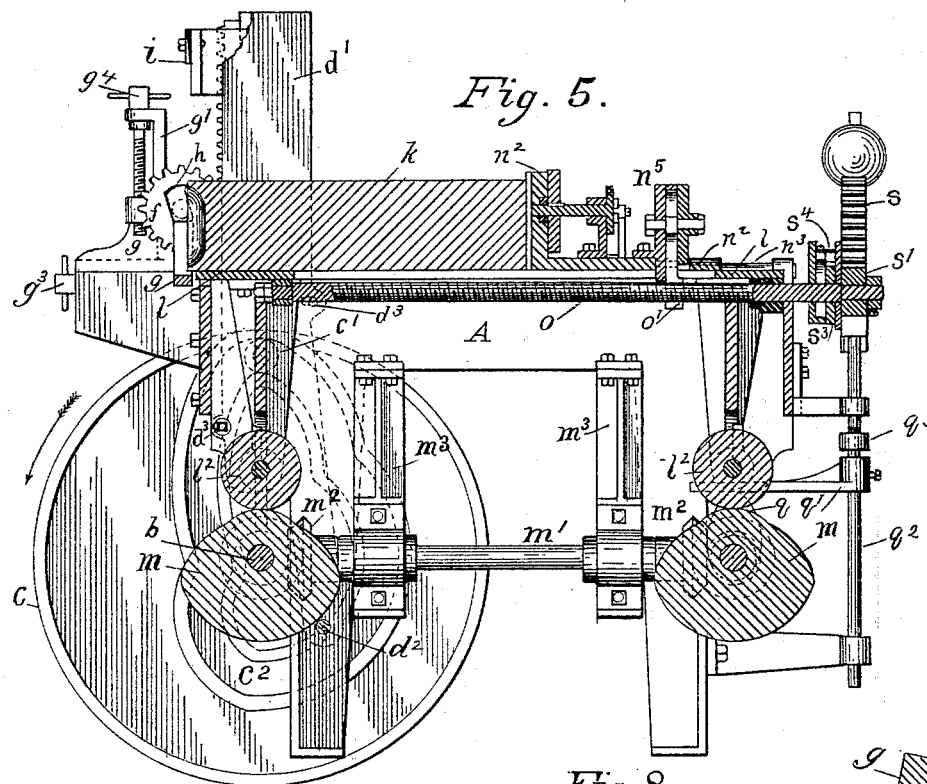
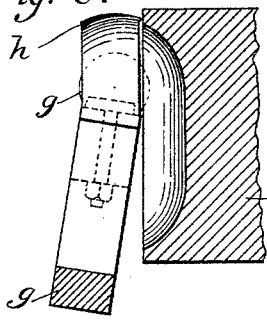 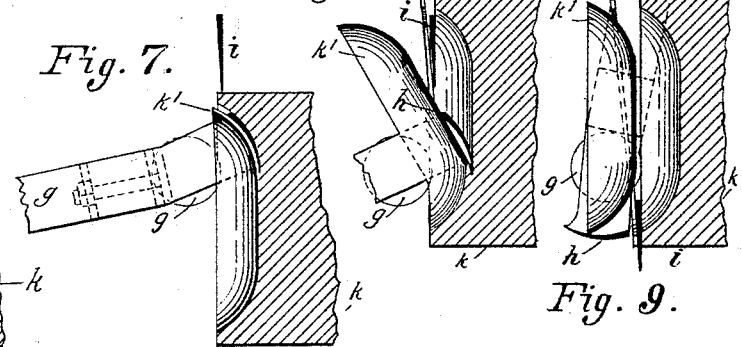
WITNESSES.  INVENTOR.

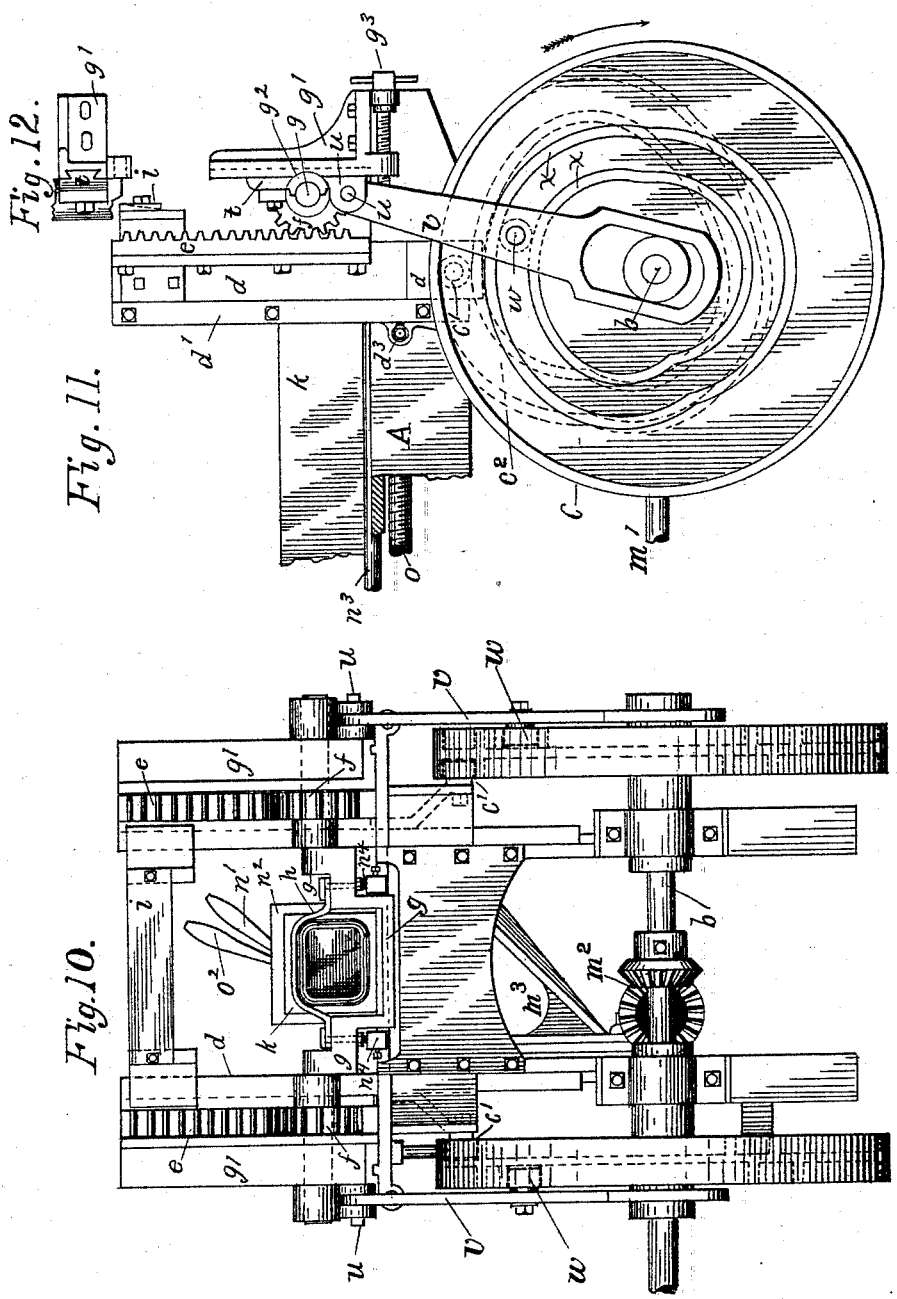

UNITED STATES PATENT OFFICE.

LEWIS W. TINKHAM, OF MANCELONA, MICHIGAN, ASSIGNOR TO THE OVAL WOOD DISH COMPANY, OF DELTA, OHIO.

METHOD OF AND MACHINE FOR CUTTING WOOD DISHES.

SPECIFICATION forming part of Letters Patent No. 497,932, dated May 23, 1893.

Application filed July 27, 1891. Serial No. 400,819. (No model.)

*To all whom it may concern:*

Be it known that I, LEWIS W. TINKHAM, a citizen of the United States, residing at Mancelona, Antrim county, Michigan, have invented certain new and useful Improvements in the Art or Method of Cutting Wood Dishes and in Machines for Cutting such Dishes, of which the following is a specification.

My invention relates to the manufacture of seamless or jointless veneer wood dishes, such as are furnished by grocers as a convenient means for carrying small quantities of butter, berries, lard and the like. These dishes are designed merely for temporary use, being so cheap that when once used they are thrown away or destroyed. Heretofore these dishes have been manufactured by cutting or scooping them, as a veneer, from the face of a block of wood, by means of a revolving or oscillating curved knife attached at its ends to a revolving or oscillating shaft. Dishes produced in this manner have been concavo-convex, and in cross section a segment of the circle described by the knife in its rotation or oscillation about the axis of its shaft. These dishes, while carried in the hand, answer their purpose admirably, but when placed upon a table a slight touch will cause the dish to rock and its contents to be spilled.

The object of my invention is to obviate the objection here pointed out by providing a method and mechanism by which dishes of the character referred to may be cut with flat or nearly flat bottoms.

The further object of my invention is to provide machines of the class described, with a shaft for the dish-cutting knife which shall not interfere with the delivery of dishes from the machine.

I am aware that flat-bottomed dishes have been made by means of a machine employing a curved or bent dish-cutting knife to slice or scoop the dishes from the face of a block of wood, said knife being attached to a continuously rotating shaft, the shaft being caused to reciprocate laterally during the stroke of the knife, causing the knife, during a portion of its stroke, to deviate from its circular path and to travel in a right line, or nearly so, thus, during its cut, describing the segment of a flattened ellipse and forming a dish with a flattened bottom. It is found in practice that the simultaneous forward motion and revolving motion of the knife, just referred to, while the knife is passing through the wood, splits a considerable percentage of the dishes produced.

The further object of my invention is to overcome this difficulty by giving to the dish-cutting knife an intermittent, rotary motion, the knife, while cutting the sides of the dish, describing the arc of a circle, and, while cutting the flat bottom of the dish, pausing in its revolution and being held rigid, the straight part of the cut being effected by the reciprocating movement, in a right line, of the knife and its shaft, or of the block itself.

In this specification in referring to the "cut" of the knife, I mean the travel of the knife or block while the knife-edge engages the block of wood, and the "intermittent" rotary motion, hereinafter referred to, means a pause of the knife in its rotation during a portion of said cut.

I attain these objects by means of the mechanism and operation of parts hereinafter described, and shown in the accompanying drawings, made part hereof, in which—

Figure 2:
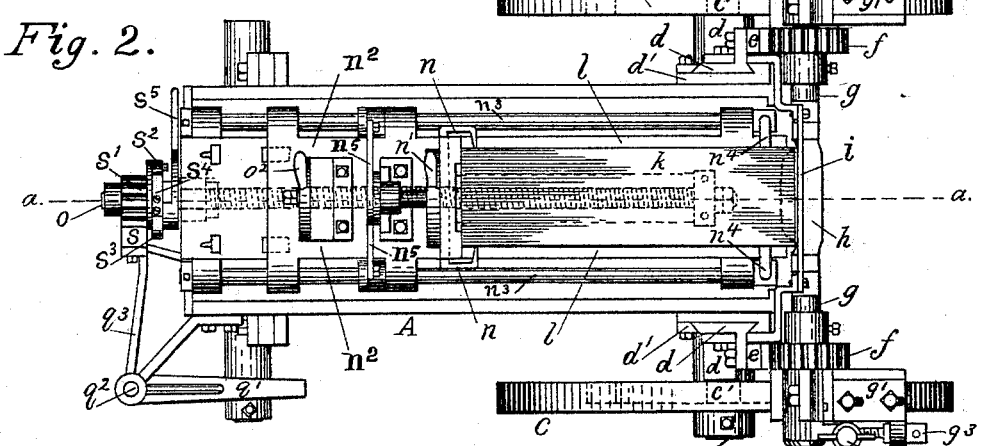

Figure 1, is a side elevation of my machine; Fig. 2, a plan view; Fig. 3, a front end elevation; Fig. 4, a rear end elevation; Fig. 5, a central, vertical sectional elevation on line *a a*, Fig. 2; Figs. 6, 7, 8 and 9, vertical cross sections of knives and block and dish at different stages of the cutting of the dish; Fig. 10, a front end elevation of a modification of my machine; Fig. 11, a side elevation of a part of the same, and Fig. 12, a plan view of sliding, adjustable shaft-box in same.

Like letters represent like parts throughout the several views.

The machine which I have illustrated as a suitable means for carrying out my invention has four principal parts, performing the four principal steps in my method of manufacturing flat bottomed wood dishes. These parts are, first, the curved or bent dish-cutting knife and the driving mechanism adapted to give the knife an intermittent, rotary motion on its shaft; second, the mechanism designed to cause either the block or knife to travel in a right line, bodily, during the pause of this knife in its rotation; third, the facing knife and its driving mechanism adapted to face off the block between the successive strokes of the dish-cutting knife; and fourth, the feeding mechanism by which the block is advanced to the knives as the work of reducing the block to dishes proceeds.

In the drawings A is a stout frame or table upon which my machine is mounted.

$b$ is the driving shaft provided with the usual pulley. (Not shown.) This shaft, at each end, is provided with a cam-wheel $c$. Cam-rollers $c'$ travel in eccentric races $c^2$ on the inner faces of cam-wheels $c$. Cam-rollers $c'$ are attached to and journaled upon bars $d$ which reciprocate vertically in a recess in standards or guide-plates $d'$. Fixed to reciprocating bars $d$ are racks $e$ which engage pinions $f$ on shaft $g$ which carry curved or bent dish-cutting knife $h$.

In Figs. 1, 2, 3, 4, and 5, sliding-heads $g'$, carrying the journals or bearings $g^2$ for shaft $g$, are made adjustable horizontally by means of adjusting-screw $g^3$ and shaft $g$ is made adjustable vertically by means of adjusting screws $g^4$ by means of which journals $g^2$ are caused to slide up or down on head $g'$. By means of this adjustability of the knife-shaft $g$ the cut of the dish-cutting knife $h$ may be controlled, and the depth and width of the dish produced may be varied. To accommodate the varied adjustments of shaft $g$ and its pinions $f$ the guide-plates $d'$ carrying vertically reciprocating bar $d$ and rack $e$ are also made adjustable horizontally. This is accomplished by loosening the nuts on bolts $d^3$ (see Fig. 1), which project from table A and which pass through elongated holes in guide-plates $d'$. The guide-plates $d'$ may now be tilted to and fro upon pivot $d^2$ at the lower extremity of said guide-plates, and may be bolted fast at such adjustment as will conform to the adjustment of shaft $g$ and its pinion $f$. Motion to the knife-shaft $g$ and its knife $h$ is communicated through cam-wheels $c$, which by the eccentricity of the races $c^2$ causes cam-rollers $c'$ to travel, carrying with them bars and racks $d\ e$. The vertical reciprocation of racks $e$ causes pinion $f$ and the knife-shaft and knife, $g\ h$, to oscillate about the axis of the knife-shaft. The races $c^2$ in which cam-rollers $c'$ travel are, during part of their course, concentric with the axis of the driving-shaft $b$ (see Figs. 1, 5, and 11), and while the cam-rollers $c'$ travel in this circular path, bar $d$ stands motionless and the rotation of the knife-shaft $g$ is, consequently, suspended, to be resumed when the eccentric part of the cam shall again give motion to the roller $c'$ and to rack and pinion $e\ f$.

The first five figures in the drawings illustrate a machine in which the table $l$, (which carries the block of wood and the feeding mechanism,) is adapted to reciprocate vertically in harmony with the movement of the dish-cutting knife, so that the block $k$ may be caused to travel while the dish-cutting knife pauses in its rotation, and so that the block stands stationary during the cut of the knife on a circular line. This is accomplished as follows: Table $l$ is provided with downwardly projecting legs $l'\ l'$ which have journaled to their lower extremities, rollers $l^2\ l^2$. The legs $l'$ slide in suitable grooves or guides in the frame of the machine. Rollers $l^2$ rest upon cams $m$, the forward cam $m$ being fixed to the driving-shaft $b$, and the rear cam $m$ to shaft $p$. Shafts $b$ and $p$ are provided with miter-gear wheels $m^2$ which engage corresponding gear-wheels on shaft $m'$ which is supported by brackets $m^3$. Front and rear cams $m$ are thus, by means of gear-wheels $m^2$ and shaft $m'$ caused to revolve in unison. The revolution of cams $m$ causes rollers $l^2$ to rise and fall carrying with them the table $l$, its attached mechanism and the block of wood.

The mechanism designed to face off the block of wood between the successive strokes of the dish-cutting knife, consists in a straight facing-knife $i$, attached at both its ends to the vertically reciprocating bars $d$ near their upper extremities. As the bars $d$ reciprocate vertically, as hereinbefore described, they carry with them the facing-knife, which follows the dish-cutting knife as it travels downward and precedes it on its return, the facing-knife at each downward stroke removing from the face of the block of wood, $k$, a slice, having the thickness of the dish cut by the knife $h$.

A convenient means for clamping the block in place consists of dogs $n$, (Figs. 1 and 2) which are caused to slide and engage and disengage the block by means of lever $n'$ the dogs and lever being attached to sliding-head $n^2$, in front of and against which the block $k$ is placed. Sliding-head $n^2$ slides to and fro on rods $n^3$, (Figs. 2 and 4) which are provided at their forward ends with additional dogs $n^4$. These dogs, $n^4$, are operated by the axial rotation of rods $n^3$ which are connected by bars $n^5$ to the shaft on which lever $n'$ is pivoted, the bars $n^5$ sliding on rods $n^3$ with sliding-head $n^2$. The dogs $n$ and $n^4$ are thrown into and out of engagement with the block simultaneously, by the movement of lever $n'$, but the rear dogs travel forward with the block while the forward dogs $n^4$ remain stationary, the sharp horizontal edges of the clamps $n^4$ permitting the block to move forward, but in no other direction.

The feed of the block up to the knives may be accomplished as follows: Feed-screw $o$ is attached centrally to the under side of table $l$ and extends the length of the table. Divided nut $o'$ engages the feed screw and is connected with traveling head $n^2$ (to which the block is clamped) by pivoted arms extending up through a slot in the table, (see Fig. 5,) these pivoted arms being extensions of the halves of the divided nut $o'$. This divided nut is opened and closed by the throw of lever $o^2$ (see Fig. 4) by means of eccentric slots in the lever engaging pins on the arms connected with the halves of the divided nut, in the usual manner. The closing or opening of the divided nut $o'$ by means of lever $o^2$ throws the feed of the block in or out of gear. The feed-screw $o$ is revolved intermittently after each cut of the two knives, by means of a cam $q$ on the end of shaft $p$, (see Figs. 1, 4 and 5) said cam actuating horizontal arm $q'$, attached to vertically reciprocating rod $q^2$, sliding in suitable bearings, said rod $q^2$ having bracket $q^3$ (see Fig. 4), carrying vertical rack, $s$, which engages pinion $s'$, running loose on the end of feed-screw $o$, and having pawl $s^2$ engaging in its forward travel, ratchet $s^3$, fixed on feed-screw $o$. Interposed between pawl $s^2$ and ratchet $s^3$, is adjustable segmental stop or shield $s^4$ by which the point at which the pawl engages the ratchet may be fixed thus controlling the throw of the ratchet, the revolution of the feed-screw, the feed of the block to the knives, and the thickness of the dish to be cut. Adjustable stop or shield $s^4$ is operated by means of lever $s^5$ which may be set at any desired adjustment. Vertical rod $q^2$ may be weighted at top, as shown, to insure constant contact between cam $q$ and arm $q'$.

The operation of my device, as thus far described, is as follows: A block of wood of suitable size, steamed in the usual manner, is clamped to traveling-head $n^2$ and the feed is thrown into gear as already described. Driving-shaft $b$ carrying cam-wheel $c$ is set in motion. Cam-wheels $c$ cause rollers $c'$, traveling in races $c^2$, to reciprocate vertically, carrying with them bars and racks $d\ e$. The racks cause the pinions $f$ fixed on shaft $g$ to revolve giving motion to shaft $g$ and dish-cutting knife $h$. The block having been fed up far enough for both knives to engage its face, and far enough for the knife $h$ to slice out from the face of the block a dish of the desired size, the knife $h$ at the beginning of its down stroke engages the face of the block and describes about a quarter of a revolution, as shown in Figs. 6 and 7, cutting one side of the dish $k'$. At this point cam-rollers $c'$ enter that part of cam-race $c^2$ which is concentric with shaft $b$ and bar and rack $d\ e$ and pinion and shaft $f\ g$ cease to move, and knife $h$ is now held rigid. At the same instant cams $m$ cause table $l$ to rise carrying with it the block $k$, in a straight line, causing the stationary knife $h$ to cut or shave the block in a straight line, as shown in Fig. 8, thus forming the flat bottom of the dish. The dish-cutting knife now, while the block is raised, is caused as before to describe the arc of a circle, as shown in Fig. 9, completing the remaining side of the dish, and separating the completed dish from the block. During the stroke of knife $h$ through the wood it is closely followed by the facing-knife $i$ carried by the descending bars $d$. Knife $i$ removes a chip from the face of the block so that the next cut of knife $h$ in the block will describe the same line as before, and produce a dish of the same size as before. Cam-wheels $c$ now cause the knives to back out by the way they came, and cams $m$ permit table $l$ and its burden, by their own gravity to resume their first position. As soon as the knives on their return have cleared the block, cam $q$ actuates the pawl-and ratchet-feeding mechanism, and feed-screw $o$ pushes the block forward a distance corresponding to the thickness of a dish, and the machine is now ready to repeat the described series of operations.

It is obvious that if, during the pause of knife $h$ in its rotation, the knife itself should be moved bodily forward while cutting the flat bottom of the dish instead of moving the block, the result would be the same as above described, and mechanism designed to give intermittent rectilinear motion to the dish-cutting knife instead of to the block, would be the obvious mechanical equivalent of the device above described. Figs. 10 and 11 illustrate this modification of the device for carrying out my method of making wood dishes. These figures illustrate only the front end of my modified machine, as the feed and clamping mechanism is the same in both, the mechanism for raising and lowering table $l$ being now omitted. The intermittent rotation of the dish-cutting knife and the reciprocation of the facing-knife are also secured in the same manner as above described. In my modified machine the journal-boxes of knife-shaft $g$ are fixed upon plates $t$ which slide vertically in grooved guides in supports $g'$ hereinbefore referred to. From plates $t$ lugs $u$ project and to these lugs are pivoted arms $v$ which at their lower ends embrace shaft $b$ in elongated openings, permitting longitudinal motion of the arms. Attached to the inner sides of arms $v$ are cam-rollers $w$ attached to and journaled upon arms $v$ and traveling in cam-races $x\ x$ on the outer faces of cam-wheels $c$. The eccentricity of cam-races $x\ x$ give vertical motion to arms $v$ and to knife-shaft $g$ and its knife $h$. A portion of cam-races $x\ x$ is concentric with shaft $b$ and during the travel of cam-roller $w$ in this part of races $x\ x$ the axis of shaft $g$ is motionless in its vertical plane.

In the modified form of machine shown, the cams and cam-rollers on the inner faces of cam-wheels $c$ cause the knife $h$ to describe part of a revolution cutting one side of the dish while the knife remains stationary in its vertical plane, as in the first instance. Now the cams and cam-rollers on the outer faces of cam-wheels $c$ cause shaft $g$ to travel downward carrying the knife bodily in a straight line, cutting the flat bottom to the dish. The inner and outer cams on cam-wheels $c$ are arranged in such relation to each other that, during the rectilinear motion of the knife, rack $e$ is caused to travel in the same direction as the knife at exactly the same rate of speed, so that rotation of pinion $f$ and shaft $g$ is prevented during the straight cut. The flat bottom being cut, arms v again stand fast while the inner cams cause the knife to describe the second arc in its cut, thus completing the dish. The inner and outer cams now carry the knives back to their original positions ready to repeat their cuts.

In Figs. 6 to 10, inclusive, is illustrated a form of shaft for the dish-cutting knife which I have adapted to avoid the difficulty sometimes encountered of the knife-shaft interfering with the delivery of the dishes, or the discharge of the dishes from the machine. To accomplish this I give the knife shaft a bend or curve in the opposite direction from the bend or curve in the dish cutting knife, and in the same plane (see Fig. 10), so that at the instant when the dish is separated from the block the shaft is out of the way.

In a machine for carrying out my invention it is not essential that the dish-cutting knife should oscillate about its axis, as the shaft may obviously be caused to describe a complete revolution with the same effect as above described.

In carrying out my method of making flat bottomed dishes, the use of the facing-knife may be dispensed with as the block may, by an independent manipulation be shaped to correspond with the outline of the upper edge of the completed dish, and the feed of the block to the dish-cutting knife may be adjusted so that the knife will engage the block upon its margin instead of upon its face, thus insuring uniformity in the size and shape of the dishes produced. The use of the facing-knife is, however, preferable.

To those skilled in the art there will suggest themselves other arrangements of the knife-shaft and cams, or mechanism equivalent to the cams, by which the knife may be caused during its cut to rotate intermittently cutting first the segment of a circle, next a straight line, and then cutting a segment of a circle, and I do not, therefore, limit my invention to the exact form of mechanism here shown by which the dish-cutting knife is caused to operate as above described.

What I claim as my invention, and desire to secure by Letters Patent, is—

1. The art or method of making flat-bottomed wood dishes of the class described, which consists, first, in causing a suitably bent or curved knife to engage the surface of a block of wood, second, causing said knife to describe the arc of a circle of which its shaft is the center, thus forming one side of the dish, third, causing said knife to pause in its rotation and to cut, in a straight line, thus forming the bottom of the dish, and fourth, in causing said knife to again describe an arc of said circle and emerge from the surface of said block, thus forming the remaining side of the dish, substantially as shown and described, for the purpose specified.

2. The art or method of reducing a block of wood to flat-bottomed dishes which consists, first, in causing a suitably bent or curved knife to engage the surface of the block, second, causing said knife to describe the arc of a circle of which its shaft is the center, thus forming one side of the dish, third, causing said knife to pause in its rotation and to cut in a straight line thus forming the bottom of the dish; fourth, causing said knife to again describe an arc of said circle and emerge from the surface of the block thus forming the remaining side of the dish; fifth, slicing off or reducing the face of the block by the thickness of a dish, and sixth, feeding the block forward a distance corresponding to the thickness of the dish, preparatory to the repetition of the described series of operations, substantially as shown and described, for the purpose specified.

3. In a machine for cutting wood dishes, a shaft carrying a suitably bent or curved dish-cutting knife, in combination with means, substantially as described, adapted to give to said knife an intermittent rotary motion during its cut, substantially as shown and described, for the purpose specified.

4. In a machine for cutting wood dishes a shaft for carrying a suitably bent or curved knife in combination with a cam or cams in the driving-gear of said shaft, adapted as described, to impart an intermittent rotary motion to said shaft, substantially as shown and described, for the purpose specified.

5. In a machine for cutting wood dishes a shaft carrying a suitably bent or curved dish-cutting knife, rotating intermittently during the cut of the knife in combination with a table, adapted to reciprocate in alternation with the rotation of said shaft, substantially as shown and described, for the purpose specified.

6. In a machine for cutting wood dishes, a shaft, carrying a suitably bent or curved dish-cutting knife, rotating intermittently during the cut of the knife and a reciprocating table, in combination with a facing-knife adapted, as described, to face off the dish-block after each stroke of the dish-cutting knife, substantially as shown and described, for the purpose specified.

7. In a machine for cutting wood dishes, a shaft carrying a suitably bent or curved dish-cutting knife, rotating intermittently during the cut of the knife a reciprocating table and a traveling head on said table, provided with suitable block-clamps, in combination with a rotating feed screw adapted to give forward motion to said traveling head, substantially as shown and described, for the purpose specified.

8. In a machine for cutting wood dishes, a shaft carrying a suitably bent or curved dish-cutting knife, rotating intermittently during the cut of the knife a facing knife adapted to face off the block after each cut of the dish-knife, a reciprocating table and a traveling-head on said table provided with suitable block-clamps, in combination with a rotating feed-screw adapted to give forward motion to said traveling-head, substantially as shown and described, for the purpose specified.

9. In a machine for cutting wood dishes a shaft carrying a suitably bent or curved dish-cutting knife in combination with a pinion on said shaft, a rack actuating said pinion, and a cam adapted and arranged to reciprocate said rack intermittently, during the cut of the knife, substantially as shown and described, for the purpose specified.

10. In a machine for cutting wood dishes, a shaft carrying a suitably bent or curved dish-cutting knife, a pinion on said shaft, an intermittently reciprocating rack, engaging said pinion, and a cam engaging said rack in combination with a table and cams adapted to reciprocate said table, substantially as shown and described, for the purpose specified.

11. In a machine for cutting wood dishes, a shaft carrying a suitably bent or curved knife, said shaft being bent or curved in an opposite direction from the knife and in the same plane, substantially as shown and described, for the purpose specified.

LEWIS W. TINKHAM.

Witnesses:
ISAAC N. RODENBAUGH,
E. L. BROOKS.